United States Patent

Taplin

[15] 3,677,095
[45] July 18, 1972

[54] FLUID OSCILLATOR FOR A LINEAR OUTPUT ACCELEROMETER

[72] Inventor: Lael B. Taplin, Livonia, Mich.
[73] Assignee: The Bendix Corporation
[22] Filed: Nov. 16, 1970
[21] Appl. No.: 89,669

[52] U.S. Cl. .......................................... 73/515, 235/201 ME
[51] Int. Cl. ........................................................G01p 15/02
[58] Field of Search ............... 73/515; 235/201 ME; 137/119, 137/81.5, 624.14

[56] References Cited

UNITED STATES PATENTS 3,469,456   9/1969   Riordan et al. ............................ 73/515

OTHER PUBLICATIONS

IBM Technical Disclosure Bulletin, Vol. 4, No. 7, December, 1961.

Primary Examiner—James J. Gill
Attorney—John R. Benefiel and Plante, Hartz, Smith & Thompson

[57] ABSTRACT

A fluid oscillator suitable for use as an accelerometer is described, comprised of a piston and cylinder housing with a constant pressure applied to one end of the piston and a pressure that is a function of piston position on the other, the resultant forces acting on the piston and its inertia causing the piston to oscillate in the cylinder at a frequency that varies linearly with the external acceleration of the unit along the axis of the piston. The varying frequency of the pressure pulses at the one end of the piston are utilized as a fluid pressure signal indicative of the level of such external acceleration.

6 Claims, 1 Drawing Figure

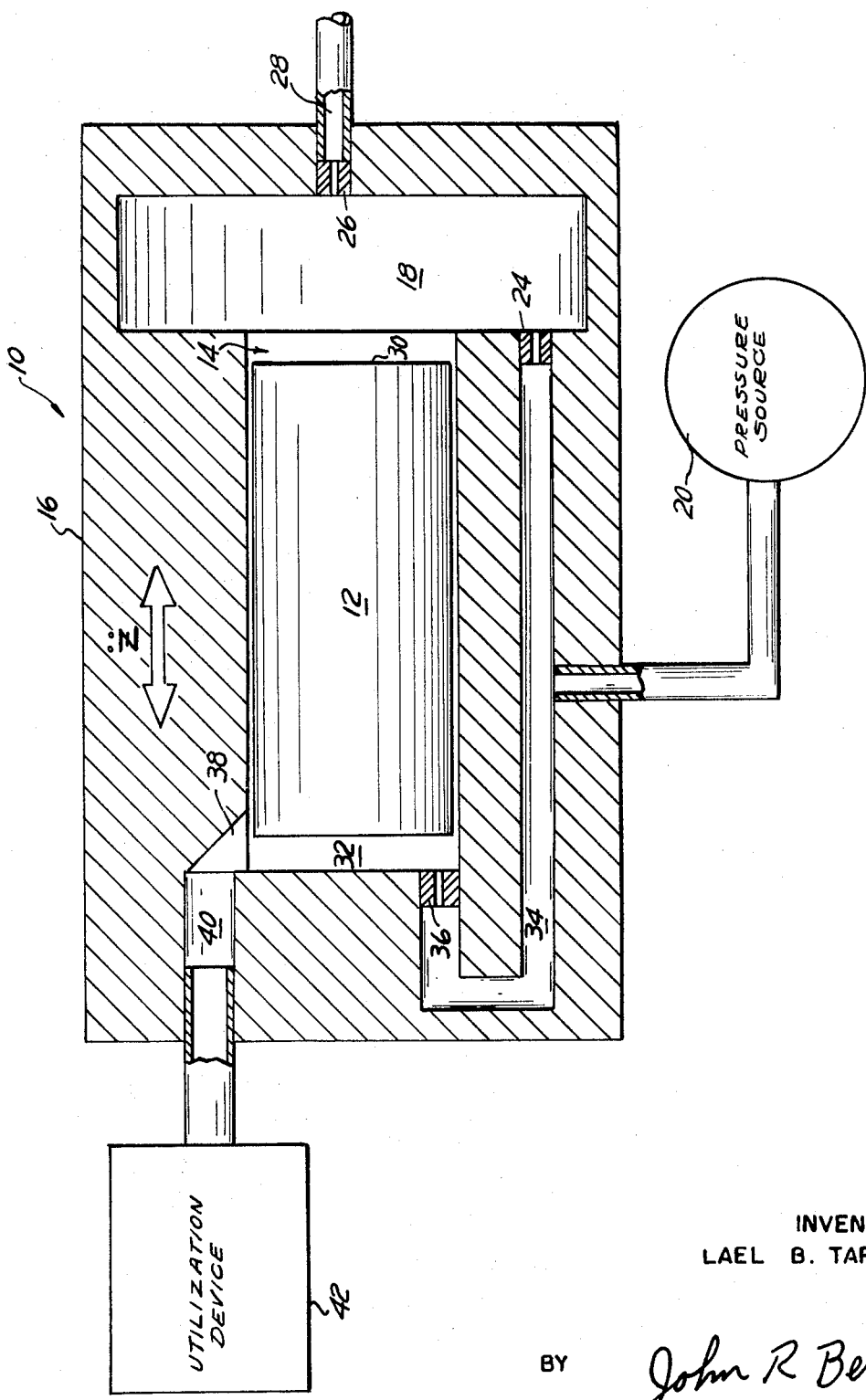

FLUID OSCILLATOR FOR A LINEAR OUTPUT ACCELEROMETER

BACKGROUND OF THE INVENTION

1. Field of the Invention

This invention concerns accelerometers and more particularly accelerometers for producing fluidic signals indicative of rates of acceleration.

2. Description of the Prior Art

In some fluidic control systems, it may be desired to process acceleration data as to some element in a digital or frequency mode, i.e., the acceleration data is represented by pressure pulses occurring at a frequency indicative of the level of acceleration of some element. In order to eliminate the need for a separate analog-to-frequency converter, it would be desirable to have an accelerometer which reads out acceleration directly in such form.

Furthermore, such an accelerometer which is insensitive to variations in ambient temperatures is often required in typical systems.

Such devices were provided in the accelerometer disclosed in U.S. Pat. No. 3,469,456 as well as copending application Ser. No. 847,649, filed Aug. 5, 1969, assigned to the same assignee as the present application; both utilizing a piston oscillated by varying fluid pressures acting thereon, but these devices suffer from the common drawback that the relationship between the external acceleration and the frequency of oscillation of the piston is nonlinear. This leads to difficulties and inaccuracies in correlating the frequency of oscillation with the imposed acceleration.

Therefore, it is an object of the present invention to provide a fluid oscillator which provides a linear relationship between an applied external acceleration and the frequency of oscillations of the fluid output pressure pulses.

SUMMARY OF THE INVENTION

This object and others which will become apparent upon a reading of the following specification and claims is accomplished by providing a piston in a cylinder housing arrangement, with the piston acted on at one end by constant force in the form of a constant pressure volume of fluid and at the other by a fluid pressure that varies as a function of piston position to set up an oscillation of the piston in the cylinder, which oscillations vary linearly with accelerations of the cylinder in a direction along the axis of the piston.

The varying frequency of the pressure pulses at the other end are utilized as a fluid pressure signal indicative of the level of accelerations of the cylinder in a direction along the axis of such external acceleration.

BRIEF DESCRIPTION OF THE DRAWING

The FIGURE is a partially sectional view of a fluid oscillator according to the present invention together with a diagrammatic representation of the supply pressure source and readout devices.

DETAILED DESCRIPTION OF THE PREFERRED EMBODIMENT

In the following detailed description, certain specific terminology will be utilized for the sake of clarity and a specific embodiment described in order to provide a complete understanding of the invention, but the invention is not so limited and may be practiced in a variety of forms and embodiments.

Referring to the FIGURE, the fluid oscillator 10 is depicted, and consists of a piston 12 disposed in a bore 14 formed in a cylinder housing 16.

To the right of the bore 14 and in communication therewith is a fluid pressure chamber 18, which is supplied with a fluid at a constant pressure by a source of regulated fluid pressure 20, via passage 22 and fixed restriction 24, while a fixed restriction 26 is provided at an outlet 28.

The net effect of this system is to create a fixed pressure in the chamber 18, so as to apply a constant force to the right end 30 of the piston 12. In order to minimize the effects of the oscillations of the piston 12 on the pressure in chamber 18, the volume thereof is selected to be a great deal larger than displacements of piston to be herein described, so that such pressure variations that do occur are rendered negligible in effect.

The source of regulated pressure 20 is also connected to a fluid pressure chamber 32 via passage 34 and fixed restriction 36. Also disposed at the periphery of chamber 32 is a slot 38 which controls communication of the chamber 32 with an outlet passage 40, the area of the slot 38 uncovered by the piston 12 in its travel defining a variable restriction outlet.

Downstream of the outlet 40 is a readout utilization device such as an appropriate control circuit represented by the block 42, which receives the pressure signals from the outlet 40.

In order to fully understand the nature of the operation of the fluid oscillator 10, as well as to demonstrate its linearity, the following mathematical derivation of the equation for the natural frequency of movement of the piston 12 in the cylinder housing 16 is here included:

Since, in general, the frequency of oscillation for typical applications must be of a magnitude of hundreds of hertz, it may be assumed heat transfer into the gas from the surroundings during an oscillation is negligible, and the process can be assumed to be adiabatic:

$$P V^k = C \tag{1}$$

where:

$P$ = absolute pressure in chamber 32 -- psia
$V$ = chamber 32 volume - in$^3$
$C$ = a constant - lbs-in$^{3\,k-2}$
$k$ = specific heat ratio - dimensionless From equation (1) we can form a linearized total differential:

$$V^k \Delta P + k P V^{k-1} \Delta V = 0 \tag{2}$$

or $$V \Delta P = - k P \Delta V \tag{3}$$

If the device is assumed to be representable as a simple spring-mass system, then:

$$\omega_n^2 = K/M \tag{4}$$

where:

$\omega_n$ = natural frequency of spring-mass system - rad/sec
$K$ = spring rate - lb/in
$M$ = mass - lb-sec$^2$/in The following relationships hold $$\Delta V = A\, y \tag{5}$$

$$\Delta F = A\, \Delta P \tag{6}$$

$$K = - \Delta F / y \tag{7}$$

where:

$A$ = cross-sectional area of piston 12 in$^2$
$y$ = linear deflection of piston 12 from balanced position - in
$\Delta F$ = change in force on piston 12 resulting from pressure change $\Delta P$ - lbs Equations (3) through (7) may be combined to give:

$$\omega_n^2 = (k A^2 P)/(M V) \tag{8}$$

Noting that $$M = \rho L A / g \tag{9}$$

and that $$V = A (y_o + y) \tag{10}$$

where:

$\rho$ = specific weight of piston 12 at standard gravity - lb/in$^3$
$L$ = length of piston 12 - in
$g$ = standard sea level acceleration of gravity - 386 in/sec$^2$
$y_o$ = distance of piston 12 from end of chamber 32 at balanced condition - in Combining equations (8) through (10) gives:

$$\omega_n^2 = \left(\frac{kg}{\rho L}\right)\left(\frac{P}{y_0+y}\right) \quad (11)$$

If we assume that the flow through both restrictions in the path through the volume is sonic, we can write:

$$\frac{C_d C_2 P_s A_s}{\sqrt{T}} = \frac{C_d C_2 W (y_0+y) P}{\sqrt{T}} \quad (12)$$

where:
$C_d$ = flow coefficient - dimensionless
$C_2$ = flow function defined by thermodynamic properties of gas - °R$^{1/2}$/sec
$P_s$ = supply pressure - psia
$A_s$ = supply orifice area - in$^2$
$T$ = absolute temperature - °R
$W$ = width of slot 38 venting chamber - in Assuming that like terms in equation (12) are equal and solving for $y_0+y$ gives:

$$y_0+y = A_s P_s / W P \quad (13)$$

Substituting equation (13) into equation (11) gives:

$$\omega_n = P\sqrt{\frac{kg}{\rho L}\cdot\frac{W}{A_s P_s}} \quad (14)$$

If an external acceleration is imposed on the device:

$$P = P_0 + \frac{M}{A}\ddot{Z} \quad (15)$$

where:
$P_o$ = fixed pressure in chamber 18 - psia
$\ddot{Z}$ = acceleration of cylinder housing 16 - in/sec$^2$ Substituting equations (9) and (15) into equation (14) gives:

$$\omega_n = \sqrt{\frac{kg}{\rho L}\cdot\frac{W}{A_s P_s}}\left(P_0+\frac{\rho L \ddot{Z}}{g}\right) \quad (16)$$

Equation 16 is the basic equation describing the fluid oscillator. Note that temperature does not appear as a term in this equation. Hence, the device should not be temperature sensitive, at least on a first order basis, and shows a linear relationship between $\ddot{Z}$ and $\omega_n$.

If the two chambers at the ends of the piston were configured identically, both with metering ports, as in the prior art devices described infra equation (4) would become $$\omega_n^2 = \frac{K_1+K_2}{M} \quad (17)$$

and the equation equivalent to (14) would be $$\omega_n^2 = \sqrt{\frac{kg}{\rho L}\cdot\frac{W}{A_s P_s}}(P_1^2+P_2^2) \quad (18)$$

where the subscripts 1 and 2 refer to the two chambers. With equation (10) it is no longer possible to demonstrate a linear relationship between $\omega_n$ and $\ddot{Z}$.

In order to design an oscillating accelerometer according to the present invention, equations defining $L, y, y_0, P_o,$ and $W$ in terms of the required frequency and acceleration must be derived. If we define the frequency with no acceleration as $f_o$ and the change in frequency for a given $\ddot{Z}$ as $\Delta f$, then from equation (16) we can write $$f_0 = \frac{1}{2\pi}\sqrt{\frac{kg}{\rho L}\cdot\frac{W}{A_s P_s}}\, P_0 \quad (19)$$

$$f_0+\Delta f = \frac{1}{2\pi}\sqrt{\frac{kg}{\rho L}\cdot\frac{W}{A_s P_s}}\left(P_0+\frac{\rho L \ddot{Z}}{g}\right) \quad (20)$$

where $f_0$ and $\Delta f$ are in hertz.
Dividing equation (20) by equation (19) and solving for $\rho L$ gives:

$$\rho L = \frac{g}{\ddot{Z}} P_0 \frac{\Delta f}{f_0} \quad (21)$$

Noting that if $y=0$, then $P=P_0$, we can write from equation (13)

$$y_0 = \frac{A_s P_s}{W P_0} \quad (22)$$

Solving equation (19) for $W$ gives:

$$W = \frac{(2\pi f_0)^2}{P_0^2}\cdot\frac{A_s P_s \rho L}{kg} \quad (23)$$

Substituting equation (23) into equation (22) gives:

$$y_0 = \frac{P_0 kg}{\rho L (2\pi f_0)^2} \quad (24)$$

Substituting equation (21) into (24) gives:

$$y_0 = \frac{k\ddot{Z}}{(2\pi)^2 f_0 \Delta f} \quad (25)$$

Substitution of equations (5) and (22) into equation (13) gives:

$$\frac{A_s P_s}{W P_0} - y = \frac{A_s P_s}{W\left(P_0+\frac{\rho L \ddot{Z}}{g}\right)} \quad (26)$$

which may be solved for $y$ to give:

$$y = \frac{A_s P_s \rho L \ddot{Z}}{W g P_0\left(P_0+\frac{\rho L \ddot{Z}}{g}\right)} \quad (27)$$

Substituting equation (23) into equation (27) gives:

$$y = \frac{k\ddot{Z}}{(2\pi f_0)^2\left(1+\frac{\rho L \ddot{Z}}{P_0 g}\right)} \quad (28)$$

However, from equation (21)

$$\frac{\Delta f}{f_0} = \frac{\rho L \ddot{Z}}{P_0 g} \quad (29)$$

Substituting equation (29) into equation (28) gives:

$$y = \frac{k\ddot{Z}}{(2\pi f_0)^2\left(1+\frac{\Delta f}{f_0}\right)} \quad (30)$$

From equation (22)

$$W = \frac{A_s P_s}{y_0 P_0} \quad (31)$$

Substituting equation (25) into equation (31) gives:

$$W = \frac{A_s P_s (2\pi)^2 f_0 \Delta f}{P_0 k \ddot{Z}} \quad (32)$$

Since $$w = \frac{C_d C_2 P_s A_s}{\sqrt{T}} \quad (33)$$

where:

$$w = \text{flow through } A_s - \text{lb/sec}$$

Equation (32) may also be written as:

$$W = \frac{w\sqrt{T}(2\pi)^2 f_0 \Delta f}{C_d C_2 k P_0 Z} \qquad (34)$$

Equations (21), (25), (28), (32), and (33) or (34) may be used to compute the basic geometry of the fluid oscillator 10.

As can be readily appreciated by the above analysis, the present invention can be very conveniently utilized as a fluid output accelerometer, with the signal output in the form of a high frequency pressure signal with a frequency varying linearly with acceleration.

Furthermore, numerous variations and modifications are possible within the scope of the present invention, as for example, providing a gas bearing support for the piston 12 in the bore 14.

In addition, while the large volume chamber 18 is a very convenient method of providing a constant force bias to the piston 12, another method could be employed such as the use of a constant force spring of an appropriate design engaging the end 30 of the piston 12. Also, if the particular application allows vertical orientation of the accelerometer, the weight of the piston mass 12 could be used as the constant force bias.

What is claimed is:

1. A fluid oscillator comprising:
   a housing;
   a mass carried by said housing and movable along a path defined by an opening formed in said housing;
   means applying a substantially constant force to said mass in one direction along said path;
   means applying a fluid pressure force on said mass in another direction along said path opposite to said one direction that is a function of the extent of movement of said mass in said one direction, including fluid pressure chamber means defined at least in part by said mass and said housing and further including means varying the fluid pressure in said fluid pressure chamber means as a function of said mass position relative said housing;
   means for providing an output signal indicative of the frequency of pressure pulses in said fluid chamber caused by oscillations of said mass, whereby said oscillator acts as an accelerometer for accelerations of said housing along said path.

2. The oscillator of claim 1 wherein said means varying said fluid pressure includes port means controlling communication of said chamber with a lower pressure region and further includes means varying the extent of said communication of said fluid pressure chamber means and said lower pressure region as a function of said mass position relative said housing.

3. The oscillator of claim 1 wherein said means providing an output signal includes means sensing the frequency of the pressure variations in said fluid pressure chamber means.

4. The oscillator of claim 2 further including fluid pressure means directing fluid under substantially constant pressure into said fluid pressure chamber areas.

5. The oscillator of claim 1 wherein said means for applying a constant force to said mass includes a second fluid pressure chamber means defined at least in part by said housing and said mass and also includes means for pressurizing said chamber with a substantially constant pressure fluid.

6. The oscillator of claim 2 wherein said port means includes a slot formed in said housing communicating with said lower pressure region and said fluid pressure chamber means and arranged to be progressively blocked by said mass by movement in said one direction along said path.

* * * * *